US010147248B2

(12) United States Patent
Graafstra

(10) Patent No.: US 10,147,248 B2
(45) Date of Patent: Dec. 4, 2018

(54) IN VIVO IDENTITY AND SECURITY APPLICATION IMPLANT AND METHOD

(71) Applicant: VivoKey Technologies Inc., Bellingham, WA (US)

(72) Inventor: Amal Graafstra, Seattle, WA (US)

(73) Assignee: VivoKey Technologies Inc., Bellingham, WA (US)

( * ) Notice: Subject to any disclaimer, the term of this patent is extended or adjusted under 35 U.S.C. 154(b) by 0 days.

(21) Appl. No.: 15/459,780

(22) Filed: Mar. 15, 2017

(65) Prior Publication Data

US 2017/0270721 A1 Sep. 21, 2017

Related U.S. Application Data

(60) Provisional application No. 62/310,439, filed on Mar. 18, 2016.

(51) Int. Cl.
*G06F 17/00* (2006.01)
*G07C 9/00* (2006.01)

(52) U.S. Cl.
CPC .................... *G07C 9/00087* (2013.01); *G07C 2009/00095* (2013.01)

(58) Field of Classification Search
USPC .......................................................... 235/375
See application file for complete search history.

(56) References Cited

U.S. PATENT DOCUMENTS

| | | | | |
|---|---|---|---|---|
| 6,092,530 | A * | 7/2000 | Weissman | A61B 5/0031 128/899 |
| 8,707,040 | B2 * | 4/2014 | Andersen | H04W 12/04 713/169 |
| 2005/0137626 | A1 * | 6/2005 | Pastore | A61N 1/3627 607/3 |
| 2008/0129465 | A1 * | 6/2008 | Rao | A61B 5/0031 340/286.02 |
| 2011/0152725 | A1 * | 6/2011 | Demir | A61B 5/0031 600/587 |
| 2013/0176207 | A1 * | 7/2013 | Grossman | G06F 3/011 345/156 |
| 2017/0250577 | A1 * | 8/2017 | Ho | H02J 50/30 |

* cited by examiner

*Primary Examiner* — Tuyen K Vo
(74) *Attorney, Agent, or Firm* — Perkins Coie LLP

(57) ABSTRACT

An implant including a platform that performs computations and that is configured to communicate with an external system, and at least one sensor that is connected to the platform and that communicates with the platform, the at least one sensor is configured to sense a biological environment surrounding the implant. The platform is configured to generate a bio-signature that corresponds to the biological environment sensed by the at least one sensor and to utilize the bio-signature to cryptographically secure data provided in the platform. The platform is configured to permit the system to access the data when the at least one sensor senses the biological environment that corresponds to the generated bio-signature, and the platform is configured to deny the system access to the data when the at least one sensor fails to sense the biological environment that corresponds to the generated bio-signature.

23 Claims, 11 Drawing Sheets

IN VIVO IDENTITY AND SECURITY APPLICATION IMPLANT AND METHOD

CROSS REFERENCE TO RELATED APPLICATIONS

The present application claims the benefit of U.S. Provisional Application No. 62/310,439 filed on Mar. 18, 2016, the disclosure of which is expressly incorporated by reference herein its entirety.

FIELD OF THE DISCLOSURE

The present disclosure relates generally to personal identity, security, cryptography, and other applications. Aspects of the present disclosure further relate to apparatus, systems, and methods for reliably, accurately, and securely identifying a living being and robustly associating a living being's biological identity with a secure identifier in electronic devices and systems such as, e.g., access control systems, messaging and communications systems, vehicles, ticketing systems, payment and remittance systems, computer systems, etc. Furthermore, aspects of the present disclosure relate to cryptographic keypair derivation, digital data encryption and decryption, and cryptographic signing and verification of digital data.

BACKGROUND OF THE DISCLOSURE

A biological entity may be registered with a digital identifier, i.e., an account may be created, such that the entity may be recognized by and interact with a system. The digital identifier may function as a proxy for the entity with regard to actions, events, data stored, and/or outcomes realized etc. in relation to the system, and any other systems with which the system interacts.

During a typical identification and authentication process, a biological entity may communicate identity data elements to the system. The biological entity may communicate by entering data on an interface such as a keyboard, by submitting biometric data through a sensor, camera, or fingerprint reader, and/or by transmitting information through visual, acoustic, and/or radio frequency identification. The system may receive the identity data elements and compare them with identity profile data (e.g. the collection and combination of static identity data elements the system uses to identify a biological entity, such as, e.g., an employee ID, an account username and password combination, a pin code, and/or stored biometric data such as fingerprint, iris scan, or heartbeat signature) that is stored in or accessible to the system. If the identity data elements sufficiently match the compared identity profile data, the biological entity may be authorized to use or interact with the system.

In addition, tangible objects such as keys (door, vehicle, safe, etc.), debit and credit cards, loyalty cards, driver licenses, passports, as well as intangible digital identity profile data such as the collection and combination of identity profiles on one or more interconnected or isolated systems connected to a biological entity device, system, or service user account identifiers such as usernames and passwords may each be used as identity tokens or proxies which are meant to represent, validate, and authorize a biological entity (living being) to access, operate, transact, or participate with the system.

These typical identification and authorization processes have several problems. For example, the submission and transmission of identity element data may not be cryptographically secured or generated. Because of this, the data may be captured during entry (e.g., via key loggers on keyboards, cameras capturing pin codes or biometric data such as iris patterns or fingerprints, etc.) and/or during transport over insecure or compromised transmission channels (e.g., man-in-the-middle attacks on SSL certificates). Because identity element data is insecure, impersonation may be achieved by submitting maliciously obtained identity element data to a targeted system.

Further, identity profile data that is stored in a compromised system may expose the biological entity to identity theft on multiple unrelated systems where the only common link may be the biological entity's identity profile data. For example, since the same identity data elements such as biometrics and user account details (e.g. usernames and passwords) may be used across multiple separate systems, a malicious actor may derive static identity data elements such as usernames, passwords, or biometric data from an identity profile that is stored or accessible within a compromised system, and emulate or present those same identity data elements to any number of other uncompromised systems that share the same identity data. Further, some biometric identity data elements, such as, e.g., fingerprints, are difficult or impossible to change, which compounds the risk associated with identity theft from a compromised system or service.

In some advanced digital identity systems, a two-factor authentication system may be implemented to address some of the concerns of unsecured transmission of identity data. In advanced digital identity systems, the biological entity may be associated with static identity data such as a PIN code. The biological entity may also have a physical device that provides additional cryptographically secure identity data such as, e.g., a set of pseudo-random temporary passcodes that are time synced with a third party server and/or that generate one-time-passwords that are cryptographically checked for authenticity. However, these advanced digital identity systems may still be lost, stolen, or intercepted since these continue to establish, manage, and maintain the identity profile of the biological entity on a separate physical device, and these systems only implement a minimal improvement in security of the identity and authentication process.

Other identity systems may incorporate biometric identification technologies such as, e.g., bone, vein, fingerprint or iris scanning. However, these technologies present unique security challenges. For example, people leave fingerprints and DNA everywhere, which may be stolen and sampled by malicious actors. Further, high-resolution cameras used today in smart phones and security CCTV systems may capture enough image data to create full three dimensional representations of a person's face and body, capture fingerprints and iris patterns, and may analyze numerous other aspects of a person's biology and behavior in great enough detail to enable replication and emulation of those biological identity elements either digitally or via analog methods such as 2D and/or 3D printing techniques. These other identity systems may also store identity profile data internally and merely compare identity data submitted against an internally stored or accessible identity profile, which is vulnerable to derivation or substitution on compromised systems.

Accordingly and at least in view of each of the above identified problems with identification and authentication processes, there exists a need for a device and/or system that permits a biological entity to rapidly, conveniently, and securely communicate information to systems.

SUMMARY OF THE EMBODIMENTS OF THE DISCLOSURE

Aspects of the present disclosure are directed to an implant comprising a reconfigurable open platform configured to perform computations.

In further embodiments, the implant further comprises at least one sensor that is connected to the platform and that is configured to communicate with the platform. The at least one sensor is configured to sense a biological environment surrounding the implant.

In additional embodiments, the platform is configured to generate a bio-signature from the biological environment sensed by the at least one sensor, and the platform is configured to utilize the bio-signature to secure data provided in the platform.

In some embodiments, the at least one sensor includes a capacitive sensor array.

In certain embodiments, the at least one sensor includes at least one of a microphone and a speaker.

In yet further embodiments, the implant further includes a biocompatible material that seamlessly encapsulates and seals the platform and the at least one sensor.

In further embodiments, the biocompatible material includes a conductive portion arranged over the at least one sensor such that the at least one sensor is configured to sense the biological environment through the conductive portion of the biocompatible material.

In additional embodiments, the conductive portion of the biocompatible material comprises a silicone elastomer doped with biocompatible conductive particles.

In certain embodiments, the implant includes an interaction component connected to the platform. The interaction component is configured to permit a biological entity to interact with the platform when the implant is implanted in the biological entity.

In some embodiments, the interaction component includes an LED display.

In yet further embodiments, the interaction component includes at least one input button that is configured to be physically depressed by the biological entity when the implant is implanted in the biological entity.

In additional embodiments, the interaction component includes at least one position detecting component, and the platform is configured to recognize a predetermined gesture initiated by the biological entity and detected by the at least one position detecting component when the implant is implanted in the biological entity.

In additional embodiments, the interaction component includes at least one acoustic component.

In some embodiments, the implant includes a biocompatible material that seamlessly encapsulates and seals the platform and the interaction component.

Further aspects of the present disclosure are directed to an implant including a platform that performs computations and that is configured to communicate with an external system, and at least one sensor that is connected to the platform and that communicates with the platform, and the at least one sensor is configured to sense a biological environment surrounding the implant. The platform is configured to generate a bio-signature that corresponds to the biological environment sensed by the at least one sensor and to utilize the bio-signature to cryptographically secure data provided in the platform. The platform is further configured to permit the system to access the data when the at least one sensor senses the biological environment that corresponds to the generated bio-signature and to deny the system access to the data when the at least one sensor fails to sense the biological environment that corresponds to the generated bio-signature.

In further embodiments, the implant includes an interaction component connected to the platform. The interaction component is configured to permit a biological entity to interact with the platform when the implant is implanted in the biological entity.

In yet further embodiments, the platform is configured permit the system to access the data only when the at least one sensor senses the biological environment that corresponds to the generated bio-signature and the biological entity interacts with the interaction component. The platform denies the system access to the data when at least one of the at least one sensor fails to sense the biological environment that corresponds to the generated bio-signature and the biological entity fails to interact with the interaction component.

In additional embodiments, the implant includes a biocompatible material that seamlessly encapsulates and seals the platform and the at least one sensor.

In yet further embodiments, the biocompatible material includes a conductive portion arranged over the at least one sensor such that the at least one sensor may sense the biological environment through the conductive portion of the biocompatible material.

In still further embodiments, the conductive portion of the biocompatible material comprises a silicone elastomer doped with biocompatible conductive particles.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein.

DETAILED DISCLOSURE

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a conductive material" would also indicate that mixtures of one or more conductive materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions (unless otherwise explicitly indicated).

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

The various embodiments disclosed herein can be used separately and in various combinations unless specifically stated to the contrary.

Figure 1:
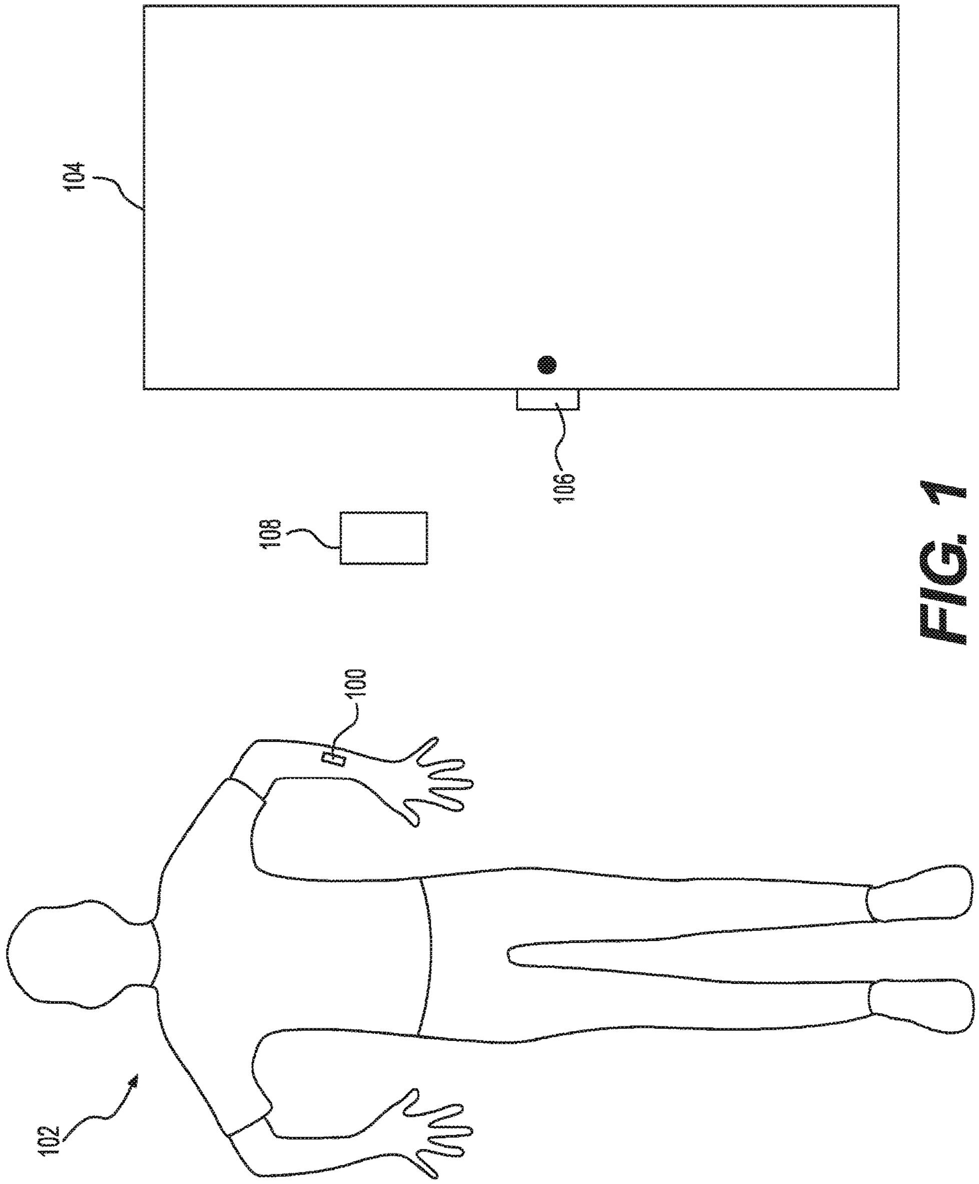
FIG. 1 illustrates a schematically-depicted view of a biological entity having an exemplary implant that validates the identity of the biological entity in accordance with aspects of the present disclosure.

Referring to FIG. 1, a schematic view of an exemplary implant 100 implanted into a biological entity 102 is depicted in accordance with aspects of the present disclosure. In embodiments, the implant 100 may be provided within the biological entity 102 in vivo. The implant 100 may be implanted, injected, and/or inserted into to the biological entity. According to aspects of the present disclosure, processes for providing the implant 100 within the biological entity may include, e.g., patient preparation, skin treatment, low-impact implantation (e.g., by using specialty tools), subdermal implantation procedures, insertion site closing techniques (e.g., specialized sutureless closure techniques, sewing techniques for high-use areas such as on the hand, fingers, arm, etc.), replacement techniques, or apparatus testing techniques, all in relation to the hand, fingers, arm, or other body parts.

In embodiments (described below), the implant 100 may operate in part to provide identity management, authentication, and/or to secure applications. In accordance with aspects of the present disclosure, the implant 100 may interact and/or communicate with external devices and/or systems (e.g. readers, smartphones, computers, etc.) (described below) so as to ensure that only the biological entity 102 connected to the implant 100 may be capable of e.g., cryptographically signing, authenticating, or validating that biological entity's identity, encrypting and decrypting data, performing related functions (such as payments), and/or performing other functions. In some embodiments (described below), the digital identity and biological identity of the biological entity are connected such that a bio-signature of said biological entity is inseparable from a cryptographically authenticated and secured digital identity.

In certain embodiments (not shown), the implant may securely communicate via, e.g., near field communication (NFC) magnetic coupling, with a mobile application executed on a smartphone for the purpose of e.g. authentication, encryption/decryption, data signing, and/or signature validation. In certain embodiments, the implant may communicate with a mobile email application to sign email messages before they are sent via a process where upon sending the message, the user may be prompted to sign the message using the implant. According to aspects of the present disclosure, the user may place the NFC antenna of the smartphone over the implant and establish a magnetically coupled link between the smartphone and implant. In embodiments, the message content to be signed may be transmitted to the implant, the message may be securely signed via user interaction with the implant, and the signature may be returned to the smartphone. In certain embodiments, additional protections may be implemented to require a PIN code and/or password to be transmitted along with the message content to validate the user's intention and protect against malicious actors attempting to covertly sign unauthorized data.

In further embodiments (not shown), the implant may be utilized in a process for securely sending money person-to-person without use of a third party network that may contact the financial intuitions where the funds are held. According to aspects of the present disclosure, the person sending the money may create a transaction using their local computing device (e.g. smartphone). In embodiments, the transaction may contain bank account details, a transaction amount, that date and time, and/or recipient bank account details, etc. In some embodiments, the transaction details may be combined into a single transaction record which may be signed by sending the data to the implant wirelessly via a peer-to-peer connection. In embodiments, the implant may generate a signature for the transaction data, and both the signature and transaction record may be given to the recipient as a voucher or digital "IOU". According to aspects of the present disclosure, the recipient may submit the signed transaction record to the sender's bank and the sender's bank may validate the transaction details by comparing the sender's account details with the cryptographic signature and the sender's bank may transfer the funds to the recipient's bank and may record the transaction.

Referring to the exemplary and non-limiting embodiment of FIG. 1, the biological entity 102 (e.g., a person) may utilize the implant 100 to proceed through a doorway 104, which may be secured using an electronic lock and/or strike 106. According to aspects of the present disclosure, a communication device 108 may securely communicate with the implant 100 to validate the biological entity's 100 authorization, disengage the electronic lock 106 and permit the biological entity 102 to proceed through the unlocked door 104. In embodiments, the implant 100 may be embedded beneath the skin of the arm of the biological entity 102, and the implant may be placed in close proximity to and coupled with the communication device 108 on a wall (not shown) near the door 104. In embodiments, the implant 100 may be embedded into other portions of the biological entity 102 including, e.g., hands, feet, etc., and may be embedded into, e.g., bone, cartilage, and/or other tissues. In certain embodiments, the communication device 108 may be a magnetically coupled radio or a functional equivalent thereof.

Figure 2:
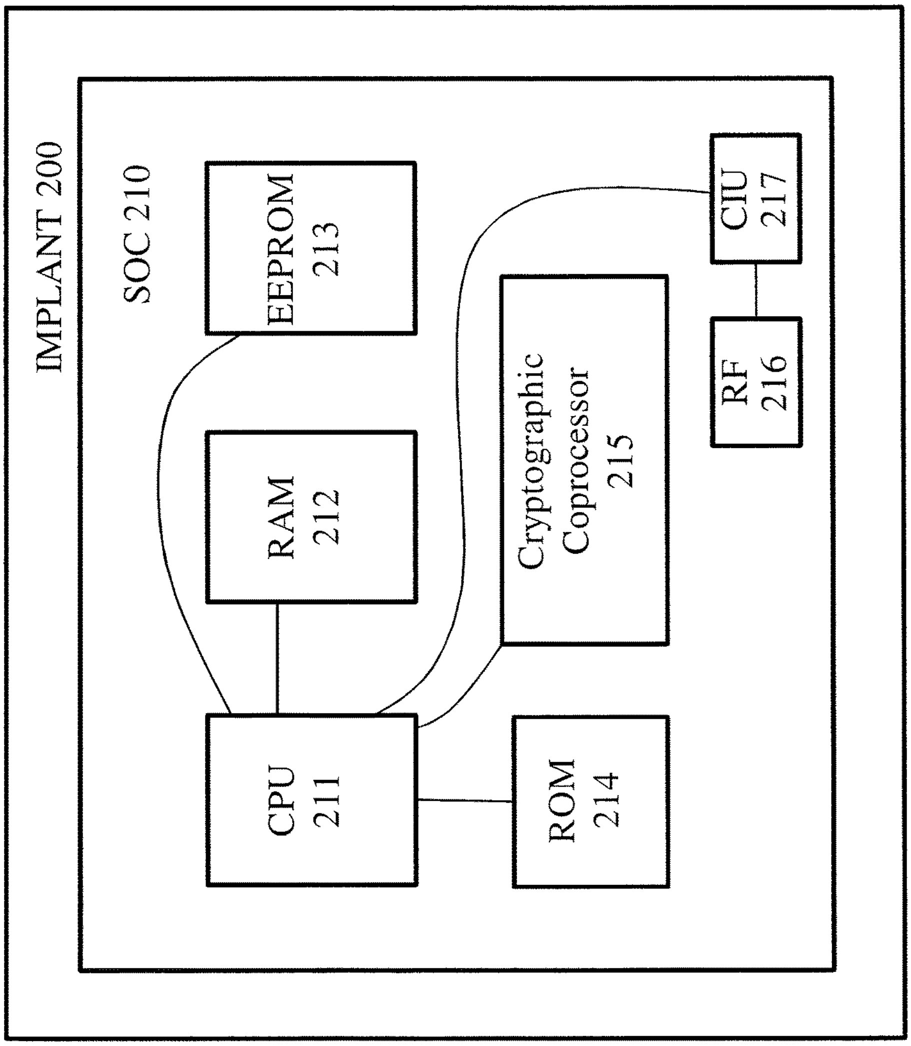
FIG. 2 illustrates a schematically-depicted view of an exemplary System-on-Chip (SOC) integrated circuit of an implant in accordance with aspects of the present disclosure.

FIG. 2 illustrates a schematically-depicted view of an exemplary System-on-Chip (SOC) 210 integrated circuit of an implant 200 in accordance with aspects of the present disclosure. However, the implant is not limited to the SOC 210 and may alternatively include a multiprocessor system-on-chip (MPSOC), or other multi-system microcontroller. By equipping the implant with the SOC 210 (i.e. an exemplary platform) in accordance with aspects of the present disclosure, the implant may function as a platform that performs computations. Further, the platform may be a reconfigurable and open platform enabling the biological entity to install software and other applications, such as third party applications that change the functionality of the implant 200. In addition, the implant 200 may ensure only valid readers communicate with the implant 200, and the implant 200 may protect information provided within the platform. In embodiments, the implant 200 may include any combination of, e.g., the SOC 210, a collection of specialized microcontrollers specific to radio frequency communications, power transmission and management components, data storage components, data processing components, and/or hardware implemented cryptography algorithms. In embodiments, the implant 200 may function as a platform for performing cryptography operations such as, e.g., encryption, decryption, data signing, verifying data signatures, etc. In further embodiments, the implant 200 may function as a platform for user authentication (e.g., logging into computers, websites, etc.), two-factor authentication (e.g., OTP, U2F, etc.) for websites and physical access devices.

Referring to FIG. 2, an exemplary embodiment of the secure SOC integrated circuit 210 may include at least one central processing unit (CPU) 211 that may for example internally generate cryptographic key pairs, cryptographically sign data, and/or validate cryptographic signatures. In embodiments, the SOC 210 may further include at least one random access memory (RAM) 212 for temporarily executing software applications, instructions, and/or processing data, at least one electrically erasable programmable read-only memory (EEPROM) 213 for dynamic application code and data storage, and/or at least one read-only memory (ROM) 214 for read only application code storage. According to aspects of the present disclosure, the CPU 211 may be directly or indirectly connected to the RAM 212, the EEPROM 213, and/or the ROM 214.

In certain exemplary embodiments, the SOC 210 may include at least one cryptographic coprocessor 215 that is directly or indirectly connected to the CPU 211 and that may implement standards based cryptography algorithms within dedicated hardware. By equipping the SOC 210 with the cryptographic coprocessor 215 in accordance with aspects of the present disclosure, the speed of the cryptography may be increased by offloading complex mathematical processes of the cryptography from the CPU 211 to specialized processors of the cryptographic coprocessor 215, which may be faster and more efficient for the cryptographic calculations. In embodiments, the SOC 210 may include at least one radio frequency (RF) component 216 and at least one Computer Interface Unit (CIU) 217, directly or indirectly connected to the CPU 211, that may provide power to the SOC 210 and that may enable communication with external devices (not shown) using, e.g., radio frequency emissions, RF magnetic and/or capacitive coupling techniques, acoustical and/or optical data transmission, etc.

Figure 3:
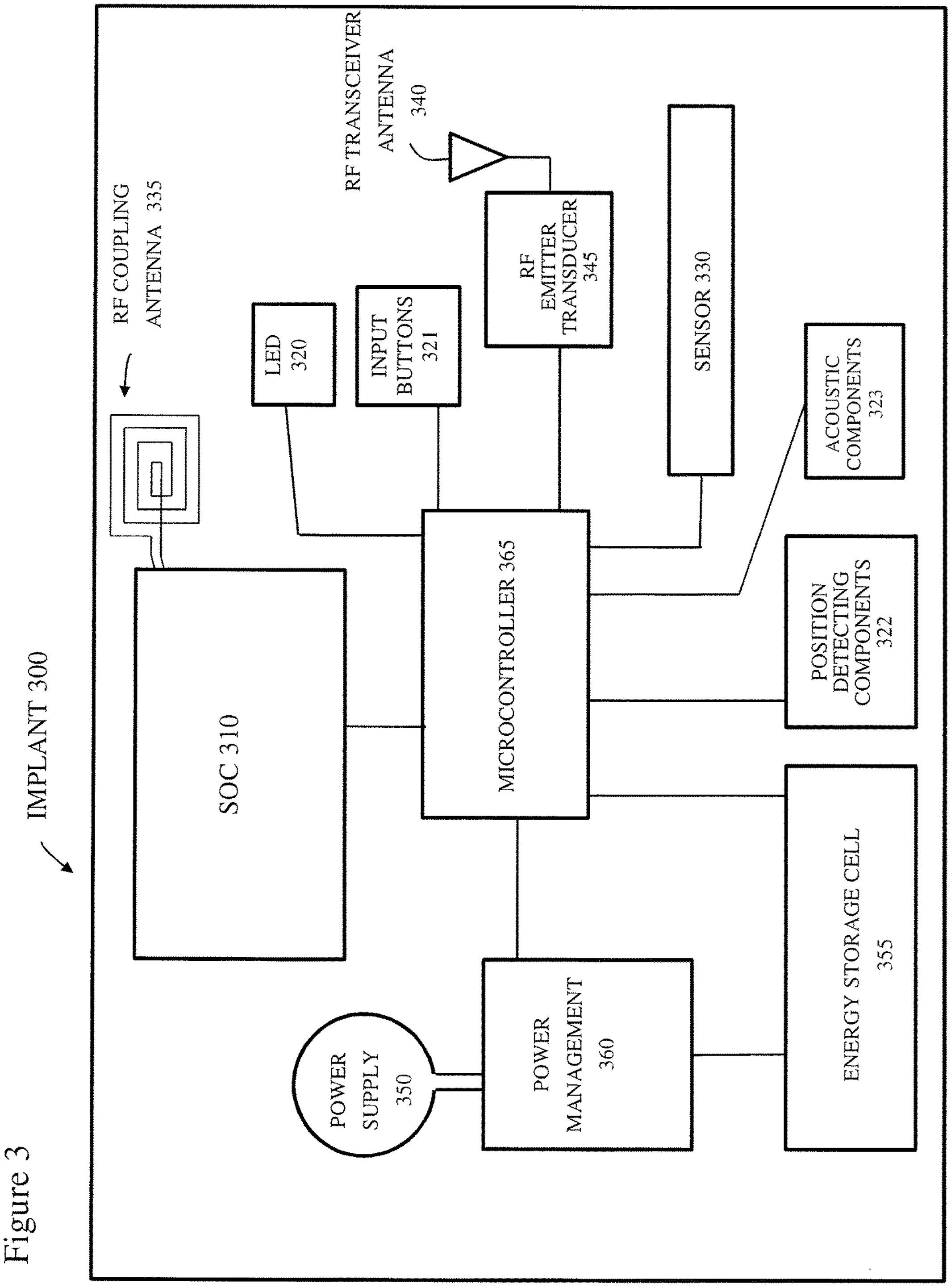
FIG. 3 illustrates a schematically-depicted view of an exemplary implant in accordance with aspects of the present disclosure.

FIG. 3 illustrates a schematically-depicted view of an exemplary implant 300 in accordance with aspects of the present disclosure. In embodiments, the implant 300 may be equipped with at least one SOC integrated circuit 310, at least one interaction component (described later), and/or at least one sensor 330 (described later). By equipping the implant 300 with the SOC 310 (i.e. at least a portion of an exemplary platform) in accordance with aspects of the present disclosure, the implant may function as a platform for performing computations, the implant 300 may ensure only valid readers communicate with the implant, and the implant 300 may protect information provided within the platform. Further, the implant 300 may interact with the biological entity (not shown) via the interaction components. In addition, the implant may sample and/or digitize the biologic material and/or the environment surrounding the implant 300 to generate a unique bio-signature that may be used to cryptographically secure data stored within the implant.

In embodiments in accordance with aspects of the present disclosure, the implant 300 may be equipped with the SOC integrated circuit 310, the interaction component, and/or the sensor 330 that may allow the biological entity to internally encrypt, decrypt, sign, and/or validate signatures attached to data using cryptographic keys stored within the implant 300. In embodiments, by transmitting data that is, e.g. encrypted, decrypted, signed, and/or validated by the implant 300 via internal cryptographic processing, it is not necessary to transmit any private or sensitive cryptographic key data to any external device, which may or may not be compromised, hostile, or otherwise insecure. According to aspects of the disclosure, the implant 300 equipped with the SOC integrated circuit 310 may allow the biological entity to safely and robustly employ standards based cryptographic methods to authenticate and/or interact securely with digital systems and services such as, e.g., online services and websites, email and other electronic messaging and communications systems, banking systems (both online and in person), escrow services, medical services, medical patient identification and/or secure records access, etc.

According to aspects of the present disclosure, the exemplary implant 300 equipped with the SOC integrated circuit 310, the interaction component, and/or the sensor 330 may allow a biological entity to securely, using standards based cryptographic methods, access and/or operate physical devices and systems such as, e.g., digital door locks, entry (ingress/egress) control systems, alarm systems, secure vault services, vehicle access and operation, weapons and weapon systems, computer terminals, computer system login services, website services, smartphones, encrypted file systems, etc. In embodiments, the implant 300 may establish and validate digital identity for cryptographically signing digital transactions such as legal contracts, financial transactions such as banking, stock trade, and escrow transactions, block chain transactions, etc. In further embodiments, the implant 300 may establish and validate personal identification and documentation such as government citizenship, passport and travel documentation, military identification, etc.

In still further embodiments, the implant 300 equipped with the SOC integrated circuit 310, the interaction component, and/or the sensor 330 may deploy cryptographically secure certification and licensing applications. In embodiments, the cryptographic identity of the biological entity may be linked to a certifying or licensing authority which contains licensee details. For example, a government agency may issue a particular license (e.g. a driver's license) through a cryptographic certificate in such a way that it only applies to that entity's cryptographic identity, and contains all relevant information such the entity's biometric details, the license issue date, expiration date, endorsements, etc. Additionally, further licensing scenarios become possible, allowing dangerous devices such as large equipment, weapons (both civilian and military), etc., to only be operated if the operator has the proper, valid license and/or training/safety certifications.

Referring to FIG. 3, the implant 300 may include the at least one interaction component that may interact with the biological entity when the implant 300 is implanted within the biological entity and before, during, or after the biological entity interacts with an external device or system. By incorporating at least one interaction component into the implant 300 in accordance with aspects of the present disclosure, the biological entity may consensually confirm an intention to interact with an external device and thus reduce the risk of an unintentional interaction with the external device that could compromise sensitive information contained within the implant 300. Further, the implant 300 may prevent an external system (e.g., a smartphone, reader, computer, etc.) from accessing data stored therein if an interaction with the interaction component is not detected. In embodiments, the implant 300 may engage the interaction components through an external trigger such as, e.g., a payment device telling the implant 300 to start a transaction. In certain embodiments, the implant 300 may automatically and/or manually engage the interaction components at the request of the biological entity, the system, and/or the device.

As depicted in FIG. 3, in embodiments the interaction component may include a light emitting diode LED display 320 that may emit light visible to the biological entity when the implant 300 is implanted within the biological entity. The interaction component may further include light detection sensors, which may be distinct or may be a part of the LED display 320, that may sense the light emitted from the LED display 320. In some embodiments, the interaction component may include one, two, or more input buttons 321 including, for example, pressure sensitive components such as, e.g., input switches, that biological entity may press when the implant 300 is implanted within the biological entity. By incorporating the LED display 320 and light detection sensors and/or input buttons 321 in accordance with aspects of the present disclosure, the implant 300 may detect an interaction of pressing into and/or down on the tissue of the biological entity, and may detect similar changes that occur while releasing pressure from the tissue (e.g., the implant 300 may perform hysteresis analysis of the light entering sensors to detect changes in diffusion due to tissue density changes).

Referring to FIG. 3, in embodiments the interaction component may include position detecting components 322 such as, e.g., accelerometers, gyroscopes, a gravity sensor, and/or digital compass components, that may detect predetermined motions and/or gestures of the biological entity that allow the biological entity to intentionally communicate with the implant 300. In certain embodiments, the interaction component may include acoustic components 323 such as, e.g., speakers or buzzers that may emit sound and/or vibrations to gain the attention of the biological entity. In further embodiments, the interaction component may include, e.g., Hall Effect and/or magneto sensors (not shown), and/or matter interaction/emitting components such as chemical release lab-on-chip components (not shown), etc. According to aspects of the present disclosure, the implant 300 may include any combination of the above described interaction components and/or functional equivalents thereof. In accordance with aspects of the present disclosure, the implant 300 may also utilize at least some of the interaction components as sensors 300 (described below) for sensing biological and/or environmental characteristics surrounding and/or in the vicinity of the implant 300. Similarly, in accordance with aspects of the present disclosure the implant 300 may further utilize at least some components of the sensor 330 for interacting with the biological entity (as described above).

As shown in FIG. 3, the implant 300 may include at least one sensor 330 that may sample and/or digitize the biological and/or environmental characteristics surrounding and/or in the vicinity of the implant 300. In embodiments the sensor 330 may include, e.g. capacitive grid sensors, microphones, and/or micro-radar technology that may, for example, sample tissue structures, may collect electrical and/or acoustical data, may detect a heartbeat and/or blood flow characteristic, or may utilize optical tissue imaging techniques like optical coherence tomography and/or other light-related sensing, etc.

By incorporating a sensor 330 in accordance with aspects of the present disclosure, the implant 300 may algorithmically and/or heuristically confirm that the biological entity within which the implant 300 is implanted, and/or the biological entity that the implant 300 is sensing, is the same biological entity that the implant 300 was originally implanted into or tied to, etc. In embodiments, the sensor 330 may determine, e.g., whether the implant 300 is still connected to the original biological entity, whether the implant 300 is still intact, and/or whether the biological entity is still alive, etc. In certain embodiments, the implant 300 may engage the sensor 330 through an external trigger (not shown) such as e.g., a payment device, that tells the implant 300 to start a transaction. In embodiments, the implant 300 may automatically and/or manually engage the sensor 330 at the request of the biological entity, the system, and/or the device.

According to aspects of the present disclosure, the implant 300 may aggregate biologic and/or other environmental data sensed by the sensor to develop a unique bio-signature that corresponds to the biological environment surrounding the implant 300 and that may be used to unlock data stores within the implant 300 and/or that may be used as seed values to generate cryptographic key pairs. By incorporating the sensor 330 in accordance with aspects of the present disclosure, if the biological environment changes significantly enough from the biological environment used to develop the bio-signature (e.g. if the implant 300 is removed from the biological entity, if the limb surrounding the implant 300 is no longer alive, etc.), the implant 300 may cease to function and thereby protect the biological entity's private data and cryptographic keys from malicious actors. In embodiments, hysteresis may account for variance and dynamic changes within the biological environment, without invalidating the biological entity's stored bio-signature. In embodiments, if the sensor 330 detects the biological environment that corresponds to the biological environment used to generate the bio-signature, the implant 300 may allow an external system (e.g., a smartphone, reader, computer, etc.) to access data stored therein.

According to aspects of the present disclosure, the sensor 330 may include a speaker (not shown) that emits a control tone and a microphone (not shown) that detects the control tone emitted by the speaker. The exemplary implant 300 may measure the transit speed of the control tone and/or any changes in the signal of the control tone as the sound travels through the biological entity. By monitoring the transit speed and/or any changes in the signal of the control tone, the exemplary implant 300 may determine the biological entity's hydration level, blood pressure, heart rate, and/or any disturbances in the location of the implant 300 (e.g., if the arm the implant 300 is implanted in is severed from the biological entity etc.) and may use any combination of these unique characteristics in developing the bio-signature.

According to aspects of the present disclosure, the implant 300 may generate a bio-signature that corresponds to a biological environment sensed by the sensor 330 and may utilize the bio-signature to cryptographically secure data provided in the implant 300. The implant 300 may permit an external system (e.g., a smartphone, reader, computer, etc.) to access the cryptographically secured data only when the sensor 330 senses the biological environment that corresponds to the generated bio-signature and when the biological entity interacts with the interaction component. Further, the implant 300 may deny the external system access to the cryptographically secured data when the sensor 330 fails to sense the biological environment that corresponds to the generated bio-signature and/or when the biological entity fails to interact with the interaction component.

Referring to FIG. 3, the implant 300 according to aspects of the present disclosure may include a tuned resonant RF coupling antenna 335 that may inductively power and/or transfer data over a magnetically coupled link to the SOC 310. In embodiments, the RF coupling antenna 335 may be printed onto, e.g., a rigid PCB substrate, a flexible PCB substrate, or directly onto a biocompatible substrate that uses, e.g., copper, silver, alloys, and/or a layered combination of conductive materials (as described below). In embodiments, the implant 300 may include an RF transceiver antenna 340 and a RF emitter transducer 345 that may allow the implant 300 to communicate with and confirm intention to, other systems. In embodiments, the implant may include a microcontroller 365 that may manage communication channels between the SOC 310 each of the other components of the implant 300.

As depicted in FIG. 3, an exemplary embodiment of the implant 300 may include a power supply 350 such as, e.g., photoelectric cells, kinetic energy generators, and/or an inductive power supply, that harvests and/or generates power for the implant 300. In certain embodiments, the implant 300 may include an energy storage cell 355 such as, e.g., a battery and/or a super capacitor, that stores energy for the implant 300. In embodiments, the implant 300 may include power management circuitry 360 that manages power for the implant 300. In embodiments, the power management circuitry 360 may limit power to other components of the implant 300 and may divert power induced from the coupling antenna 335 to the energy storage cell 355. In certain embodiments, the power management circuitry 360 may utilize the power supply 350, separately or in conjunction with the coupling antenna 335, to charge the energy storage cell 355. According to aspects of the present disclosure, the power management circuitry 360 may determine that a sufficient amount of energy has been stored in the energy storage cell 355 and may provide power to other components of the implant 300 and initiate communication between the SOC 310 and an external system to allow the implant 300 to communicate with the system. By utilizing the power management circuitry 360 according to aspects of the present disclosure, the implant 300 may satisfy the power demands of the advanced platform circuitry in an isolated and sealed microenvironment within the biological entity.

Figure 4:
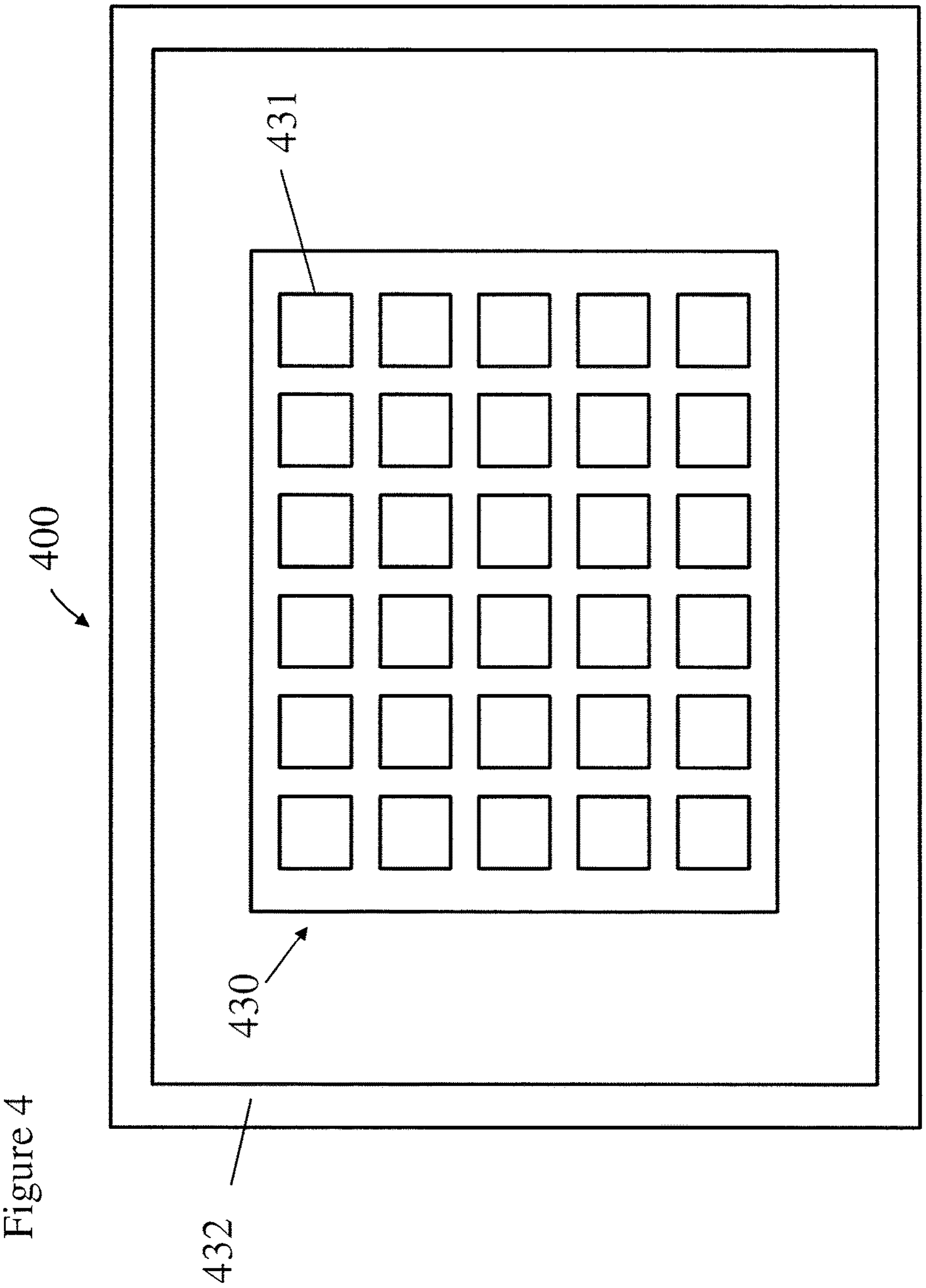
FIG. 4 illustrates a schematically-depicted view of an exemplary implant in accordance with aspects of the present disclosure.

FIG. 4 illustrates a schematically-depicted view of an exemplary implant 400 in accordance with aspects of the present disclosure. In embodiments, the implant 400 may include an anti-migration coating and/or a porous material on an exterior surface thereof to securely and tightly couple the implant 400 to biological tissues such as, e.g., collagen, fibrin, vascular tissues, bone, and/or combinations thereof. By securely coupling the implant 400 to biological tissues in this manner, the implant 400 may accurately sample and/or digitize data from the surrounding biological environment, which may include a unique environment created by tissue growing into the anti-migration coating and/or other surrounding tissues, and to ensure there has been no tampering and/or removal of the implant 400 from the biological entity. In embodiments, if the implant 400 detects that there has been tampering and/or removal of the implant 400 from the biological entity, the implant 400 may be rendered inoperable.

Referring to FIG. 4, in exemplary embodiments the implant 400 may include a capacitive sensor array 430 having a plurality of capacitive electrodes 431 and a grounding trace 432 that may safely isolate the sensor 430 from biological tissues while preserving the function of the sensor 430. By incorporating the sensor 430 in accordance with aspects of the present disclosure, the implant 400 may digitize the structural makeup of biological tissues by processing signal data collected by the capacitive electrodes 431 and grounding trace 432 to generate the bio-signature of the biological entity which may be stored and compared against future readings using hysteresis algorithms. According to aspects of the present disclosure, the implant 400 may map biological structures near or surrounding the implant 400 in order to create an identifiable map of unique biological structures at the specific implantation site, and may use that map to validate that the implant 400 has not been tampered with and/or removed from the implantation site. In embodiments, when a bio-signature reading is determined by the implant 400 to be out of hysteresis bounds, the implant 400 may shut down and secure itself against unauthorized use.

In embodiments in accordance with aspects of the present disclosure, the implant 400 may generate the bio-signature through the utilization of short range radar emitter technology (not shown) to sample, map, and identify the structure of biological tissue near the radar emitter. In certain embodiments, the implant 400 may generate the bio-signature via an optical reader (not shown) to image and map surrounding tissue structures, using, e.g., optical coherence tomography and/or a reflective system using a charge coupled device (CCD) and/or other light sensitive sensors (not shown). In other embodiments, the implant 400 may generate the bio-signature by sampling electrical potentials across a surface of a biocompatible substrate in an in vivo galvanic response detection system (not shown).

Figure 5:
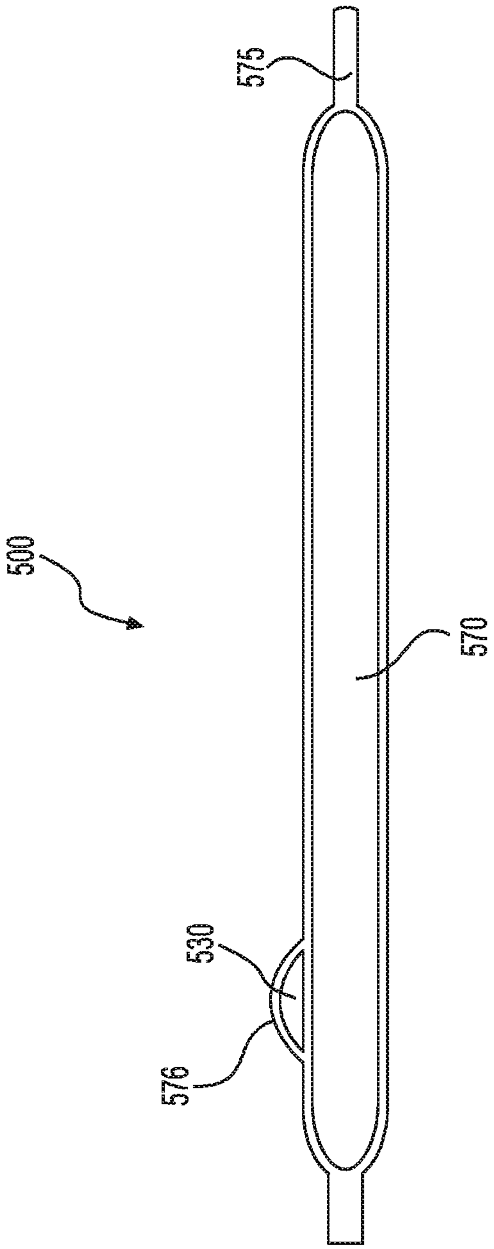
FIG. 5 illustrates a schematically-depicted side view of an exemplary implant in accordance with aspects of the present disclosure.

FIG. 5 illustrates a schematically-depicted side view of an exemplary implant 500 in accordance with aspects of the present disclosure. In an exemplary embodiment, components (e.g. the SOC, the interaction component, and/or the sensor) of the implant 500 may be provided via printed circuit techniques on a printed circuit board (PCB) 570 material such as, e.g. rigid FR4 or flexible polyamide. In embodiments, the components of the implant 500 provided on the PCB 570 may be treated and seamlessly encapsulated in biocompatible materials and/or coatings 575, such as, e.g. silicone elastomer, whereby the entire implant 500 may be suitable for medically safe permanent subdermal implantation within the biological entity. According to aspects of the present disclosure, a seamless encapsulation may mean that the biocompatible materials 575 provide a continuous encapsulation around the implant 500 such that no structure of the implant 500 permeates the continuous biocompatible materials 575 and such that fluids may not permeate the encapsulation. In embodiments, the biocompatible coating 575 may include an isotropically and/or anisotropically conductive biocompatible material 576, e.g., silicone elastomer doped with gold, titanium, and/or any other biocompatible conductive particles (e.g., nanoparticles), having low dielectric strength. In embodiments, the conductive biocompatible material 576 may be provided over the sensor 530 such that the sensor 530 may communicate electronically with the biological entity through the conductive biocompatible material 576 without comprising biocompatibility.

Figure 6:
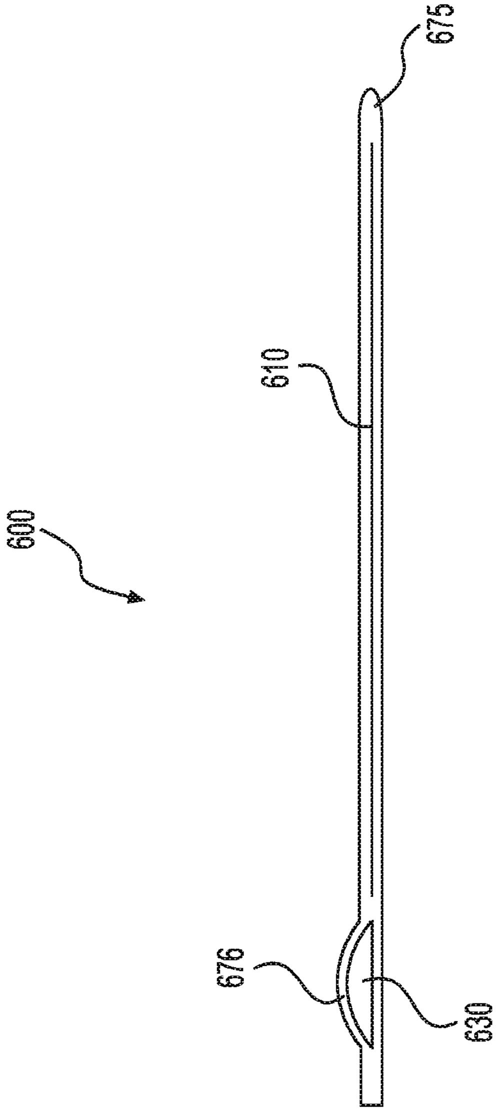
FIG. 6 illustrates a schematically-depicted side view of an exemplary implant in accordance with further aspects of the present disclosure.

FIG. 6 illustrates a schematically-depicted side view of an exemplary implant 600 in accordance with further embodiments of the present disclosure. In an exemplary embodiment, components (e.g. the SOC 610, the interaction component, and/or the sensor) of the implant 600 may printed directly on to and seamlessly sealed within the biocompatible coating material 675 such that the entire implant 600 may be suitable for medically safe permanent subdermal implantation within the biological entity (not shown). In embodiments, the biocompatible coating 675 may include the conductive biocompatible material 676 that may be provided over the sensor 630 such that the sensor 630 may communicate electronically with the biological entity through the conductive biocompatible material 676. By incorporating the conductive biocompatible material 676 into the biological coating material 675 according to aspects of the present disclosure, the implant 600 may be encapsulated for safe implantation in the biological entity. Further, because the sensor 630 may electrically communicate with the biological entity through the conductive biocompatible material 676, each component of the sensor 630 may be encapsulated within the biocompatible material 676 thereby eliminating any seems and/or weak points in the biocompatible material 676 while also decreasing complexity in the encapsulation of the implant 600 and decreasing manufacturing costs without comprising biocompatibility.

Figure 7:
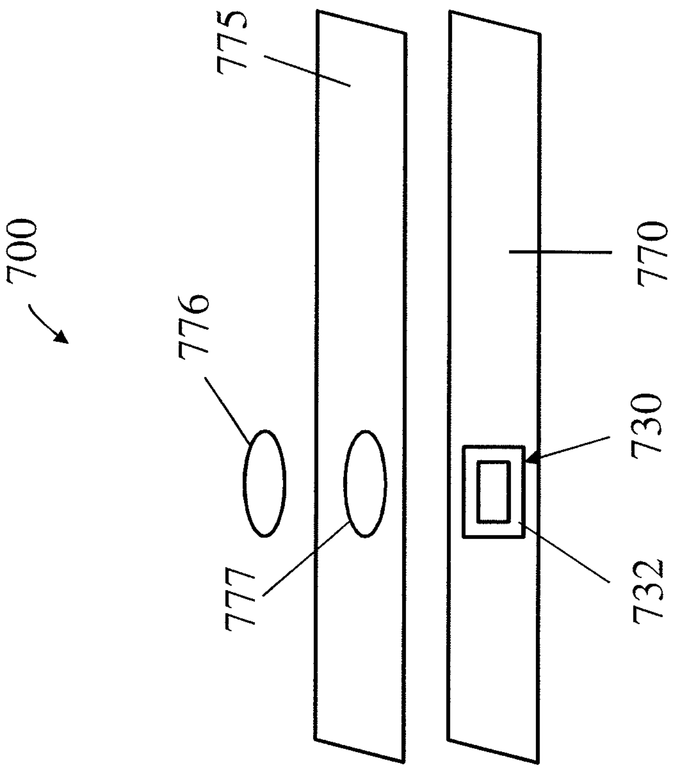
FIG. 7 illustrates an exploded schematically-depicted side view of an exemplary implant in accordance with aspects of the present disclosure.

FIG. 7 illustrates an exploded schematically-depicted side view of an exemplary implant 700 in accordance with aspects of the present disclosure. In the exemplary embodiment, the implant 700 may include the capacitive sensor 730 and grounding trace 732 provided on the PCB 770. In embodiments, the capacitive sensor 730, the grounding trace 732 and the PCB 770 may be coated with a non-conductive high dielectric strength biocompatible material 775. In certain embodiments, a hole 777 situated directly above the capacitive sensor 730 may be provided in the non-conductive biocompatible material 775. In embodiments, the hole 777 may be covered, plugged, and/or filled by the conductive biocompatible material 776 such that the that the sensor 730 may communicate electronically with the biological entity through the conductive biocompatible material 776 without comprising biocompatibility.

Figure 8:
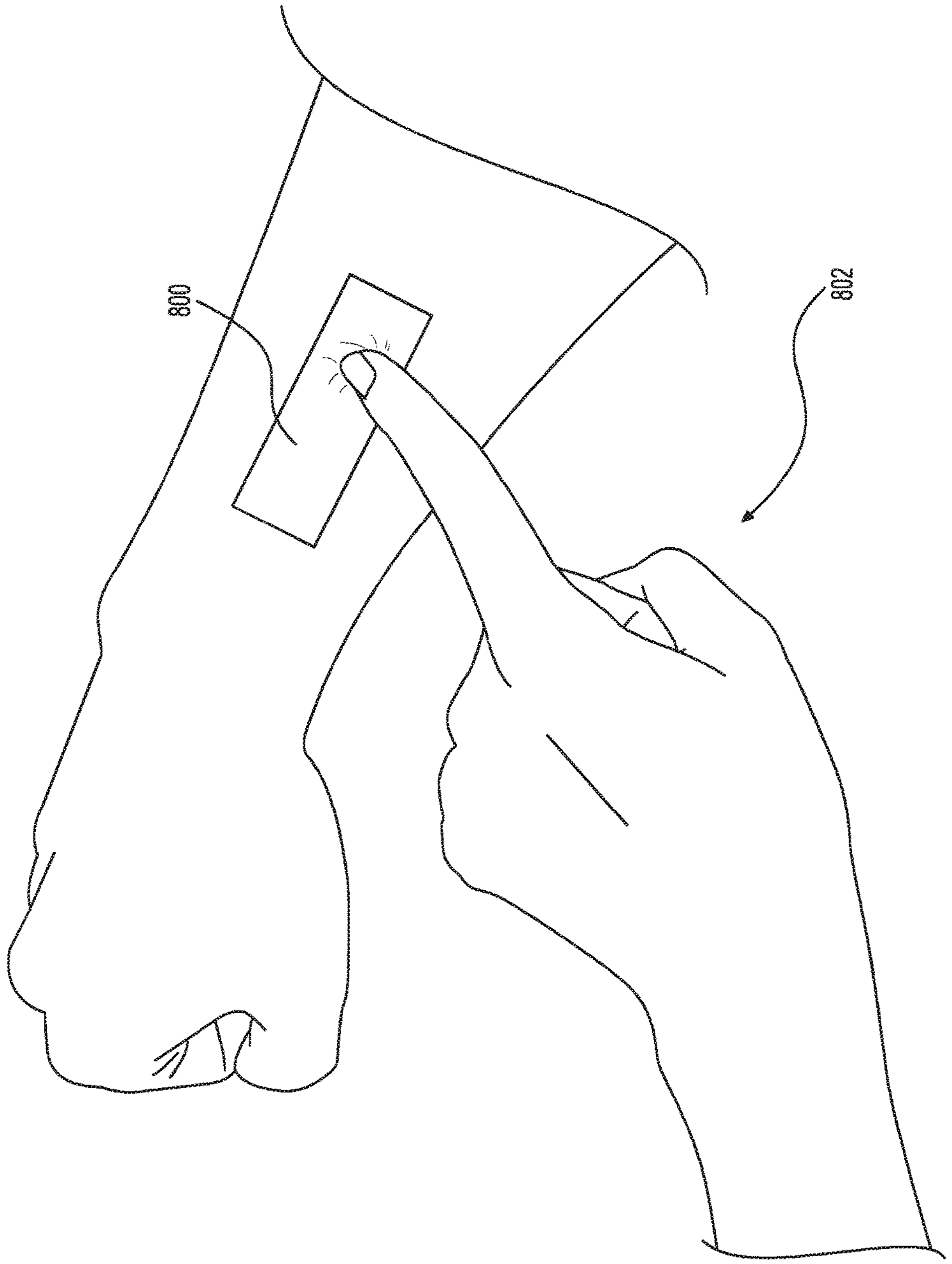
FIG. 8 illustrates a schematically-depicted view of a biological entity interacting with an exemplary implant in accordance with aspects of the present disclosure.

FIG. 8 illustrates a schematically-depicted view of a biological entity 802 interacting with an exemplary implant 800 in accordance with aspects of the present disclosure. In the exemplary embodiment, the biological entity 802 may apply pressure to tissues directly above or surrounding interaction components (as described above) of the implant 800 thereby allowing the biological entity 802 to communicate consent to the implant 800.

Figure 9:
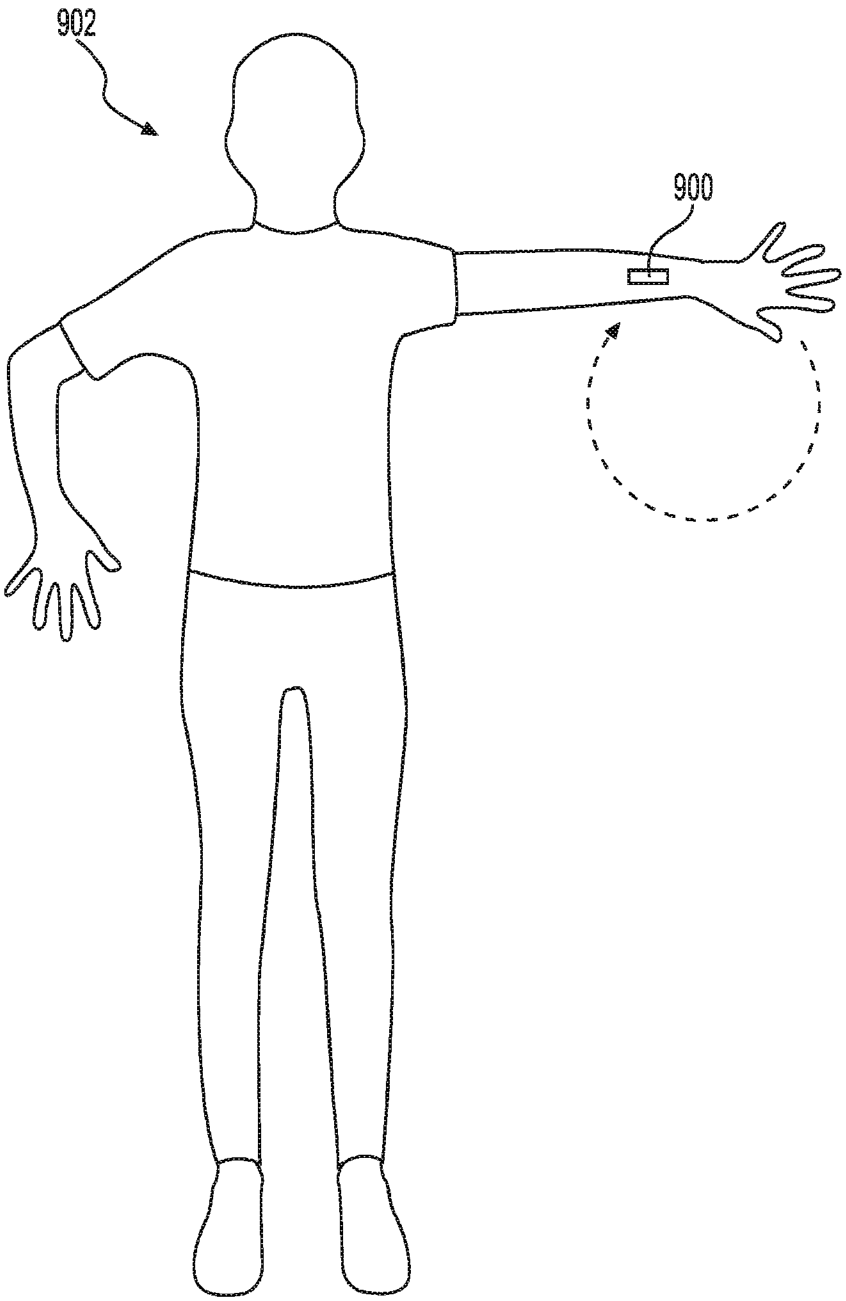
FIG. 9 illustrates another schematically-depicted view of a biological entity interacting with an exemplary implant in accordance with aspects of the present disclosure.

FIG. 9 illustrates another schematically-depicted view of a biological entity 902 interacting with an exemplary implant 900 in accordance with aspects of the present disclosure. In the exemplary embodiment, the biological entity 902 may initiate a gesture, e.g. circular movement of the hand, which may be detected by at least one interaction component, e.g. a position detecting component, of the implant 900 thereby allowing the biological entity 902 to consensually communicate with the implant 900.

Figure 10:
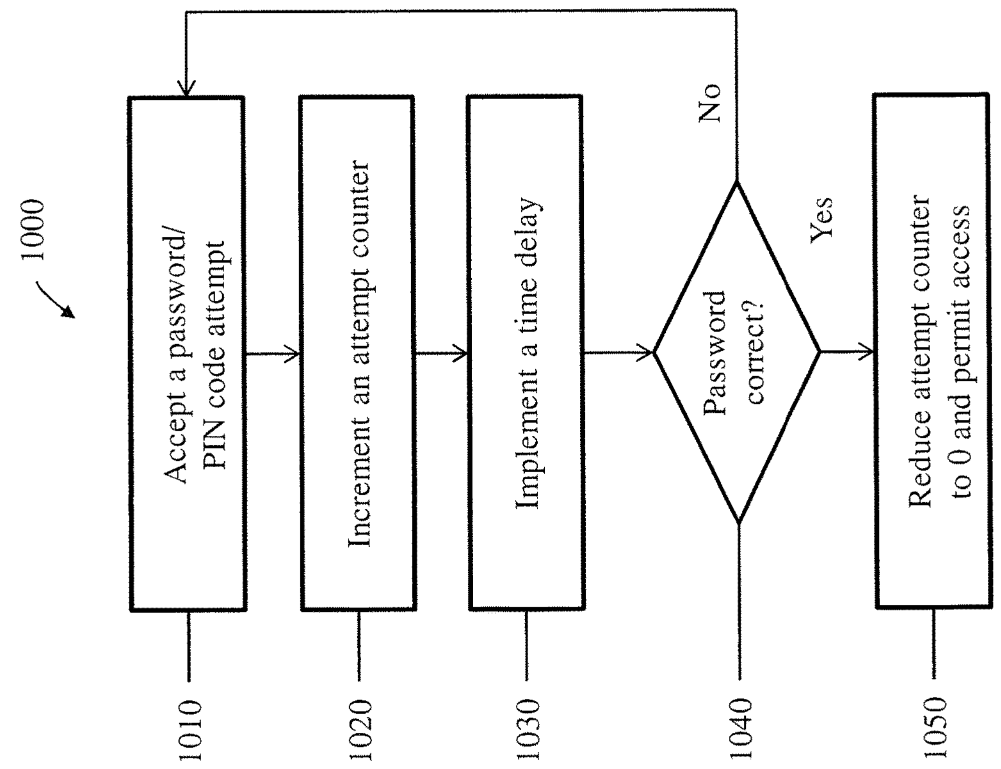
FIG. 10 illustrates an exemplary process for protecting an exemplary implant from a brute force hack attempt in accordance with aspects of the present disclosure.

FIG. 10 illustrates an exemplary process 1000 for protecting an exemplary implant from tampering (e.g. a brute force hack attempt) in accordance with aspects of the present disclosure. In embodiments, a pre-tarpit process 1000 may secure the implant from a brute force hacking attempt where power supplied to the implant may be controlled by the system attempting to hack the implant (e.g., when the implant may be powered inductively by a reader that is operated by a user attempting to hack the implant). As shown in the exemplary process of FIG. 10 at step 1010, the implant may accept a password and/or pin code attempt from a system. At step 1020, prior to checking the authenticity of the password and/or pin code attempt, the implant may increment an attempt counter. At step 1030, the implant may implement a time delay. In embodiments, the time delay may be a constant predetermined time period, e.g. a millisecond, a second, a minute, etc., or the time delay may be dynamic whereby the time delay may progressively increase in duration with each additional increment of the attempt counter and may implement a maximum time delay cap or let the attempt counter act as an unlimited delay multiplier, e.g., where the delay may equal the number of attempts multiplied by, for example, 1 second. At step 1040, the implant may check the authenticity of the password and/or pin code attempt, and if the implant determines that the password and/or pin code attempt is not authentic, the implant may deny access and may standby for entry of another password and/or pin code attempt whereby the implant may return to step 1010. At step 1040, if the implant determines that the password and/or pin code attempt is authentic, the implant may proceed to step 1050 whereby the implant may reduce the attempt counter to 0 and permit the system to access the implant. By implementing the pre-tarpit process 1000 in accordance with aspects of the present disclosure, the implant may be protected from a brute force hacking attempt in which power to the implant may be controlled by the system attempting to hack the implant.

Aspects of embodiments of the present disclosure (e.g., control systems for the implant, external systems that interact with the implant, etc.) can be implemented by such special purpose hardware-based systems that can perform the specified functions or acts, or combinations of special purpose hardware and computer instructions and/or software, as described above. The control systems may be implemented and executed from either a server, in a client-server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure (e.g., control systems for the implant) may take the form of a computer program product embodied in any tangible medium of expression having computer-usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (in the form of a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet,
- a magnetic storage device
- a usb key, and/or
- a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 11:
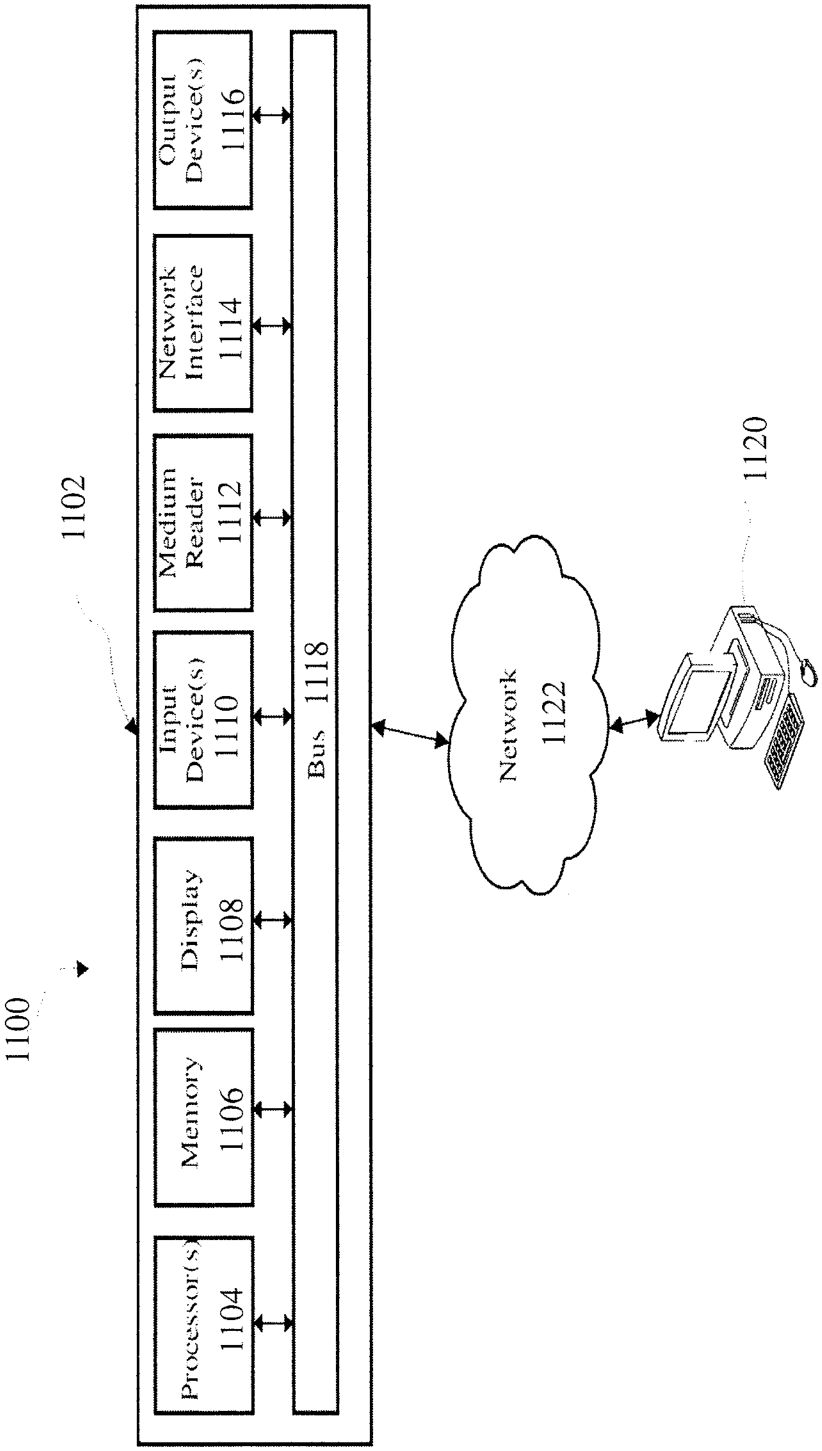
FIG. 11 illustrates an exemplary system for use in accordance with the embodiments described herein.

FIG. 11 is an exemplary system for use in accordance with the embodiments described herein. The system 1100 is generally shown and may include a computer system 1102, which is generally indicated. The computer system 1102 may operate as a standalone device or may be connected to other systems or peripheral devices. For example, the computer system 1102 may include, or be included within, any one or more computers, servers, systems, communication networks or cloud environment.

The computer system 1102 may operate in the capacity of a server in a network environment, or in the capacity of a client user computer in the network environment. The computer system 1102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a smartphone with an integrated NFC reader, a smart card reader, a reader device, a personal trusted device, a web appliance, or any other machine capable of executing a set of instructions (sequential or otherwise) that specify actions to be taken by that device. Further, while a single computer system 1102 is illustrated, additional embodiments may include any collection of systems or sub-systems that individually or jointly execute instructions or perform functions.

As illustrated in FIG. 11, the computer system 1102 may include at least one processor 1104, such as, for example, a central processing unit, a graphics processing unit, or both. The computer system 1102 may also include a computer memory 1106. The computer memory 1106 may include a static memory, a dynamic memory, or both. The computer memory 1106 may additionally or alternatively include a hard disk, random access memory, a cache, or any combination thereof. Of course, those skilled in the art appreciate that the computer memory 1106 may comprise any combination of known memories or a single storage.

As shown in FIG. 11, the computer system 1102 may include a computer display 1108, such as a liquid crystal display, an organic light emitting diode, a flat panel display, a solid state display, a cathode ray tube, a plasma display, or any other known display. The computer system 1102 may include at least one computer input device 1110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 1102 may include multiple input devices 1110. Moreover, those skilled in the art further appreciate that the above-listed, exemplary input devices 1110 are not meant to be exhaustive and that the computer system 1102 may include any additional, or alternative, input devices 1110.

The computer system 1102 may also include a medium reader 1112 and a network interface 1114. Furthermore, the computer system 1102 may include any additional devices, components, parts, peripherals, hardware, software or any combination thereof which are commonly known and understood as being included with or within a computer system, such as, but not limited to, an output device 1116. The output device 1116 may be, but is not limited to, a speaker, an audio out, a video out, a remote control output, or any combination thereof.

Furthermore, aspects of the disclosure may take the form of a computer program product accessible from a computer-usable or computer-readable medium providing program code for use by or in connection with a computer or any instruction execution system. The software and/or computer program product can be implemented in the environment of FIG. 11. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a) computer-readable storage medium include a semiconductor or solid state memory; magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, while many of the structures discussed herein may be used in the context of a low-pressure environment for a high-speed transportation system, the enclosed environments may also be utilized in different contexts (e.g., other high-speed transportation systems, or vacuum facilities for clean rooms). Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the invention has been described with reference to specific embodiments, those skilled in the art will understand that various changes may be made and equivalents may be substituted for elements thereof without departing from the true spirit and scope of the invention. While exemplary embodiments are described above, it is not intended that these embodiments describe all possible forms of the invention. Rather, the words used in the specification are words of description rather than limitation, and it is understood that various changes may be made without departing from the spirit and scope of the disclosure. In addition, modifications may be made without departing from the essential teachings of the invention. Furthermore, the features of various implementing embodiments may be combined to form further embodiments of the invention.

What is claimed is:

1. An implant comprising a reconfigurable platform onto which computer software can be installed, the platform being configured to:

generate a bio-signature that corresponds to a biological environment surrounding the implant;

permit an external system to remotely access data provided in the platform responsive to a determination that the biological environment corresponding to the bio-signature can be sensed; and deny the external system from remotely accessing the data provided in the platform responsive to a determination that the biological environment corresponding to the bio-signature cannot be sensed.

2. The implant according to claim 1, further comprising:

at least one sensor that is connected to the platform and that is configured to communicate with the platform, wherein the at least one sensor is configured to sense the biological environment surrounding the implant.

3. The implant according to claim 2, wherein the at least one sensor includes a capacitive sensor array.

4. The implant according to claim 2, wherein the at least one sensor includes at least one of a microphone, accelerometer, gyroscope, and gravity sensor.

5. The implant according to claim 2, further comprising:

a biocompatible material that seamlessly encapsulates and seals the platform and the at least one sensor.

6. The implant according to claim 5, wherein the biocompatible material includes a conductive portion arranged over the at least one sensor such that the at least one sensor is configured to sense the biological environment through the conductive portion of the biocompatible material.

7. The implant according to claim 6, wherein the conductive portion of the biocompatible material comprises a silicone elastomer doped with biocompatible conductive particles.

8. The implant according to claim 1, further comprising:

an interaction component that is connected to the platform, wherein the interaction component is configured to permit a biological entity to interact with the platform when the implant is implanted in the biological entity.

9. The implant according to claim 8, wherein the interaction component includes a light-emitting diode (LED) display.

10. The implant according to claim 8, wherein the interaction component includes at least one input button that is configured to be physically depressed by the biological entity when the implant is implanted in the biological entity.

11. The implant according to claim 8, wherein the interaction component includes at least one position detecting component, and wherein the platform is configured to recognize a predetermined gesture initiated by the biological entity and detected by the at least one position detecting component when the implant is implanted in the biological entity.

12. The implant according to claim 8, wherein the interaction component includes at least one acoustic component.

13. The implant according to claim 8, further comprising:
a biocompatible material that seamlessly encapsulates and seals the platform and the interaction component.

14. An implant comprising:
a platform that performs computations and that is configured to communicate with an external system; and
at least one sensor that is connected to the platform and that communicates with the platform, the at least one sensor being configured to sense a biological environment surrounding the implant,
wherein
the platform is configured to generate a bio-signature that corresponds to the biological environment sensed by the at least one sensor and to utilize the bio-signature to cryptographically secure data provided in the platform,
the platform is configured to permit the external system to access the data when the at least one sensor senses the biological environment that corresponds to the generated bio-signature, and
the platform is configured to deny the external system access to the data when the at least one sensor fails to sense the biological environment that corresponds to the generated bio-signature.

15. The implant according to claim 14, further comprising:
an interaction component connected to the platform, wherein the interaction component is configured to permit a biological entity to interact with the platform when the implant is implanted in the biological entity.

16. The implant according to claim 15,
wherein the platform is configured to permit the external system to access the data only when the at least one sensor senses the biological environment that corresponds to the generated bio-signature and the biological entity interacts with the interaction component, and
wherein the platform is configured to deny the external system access to the data when at least one of the at least one sensor fails to sense the biological environment that corresponds to the generated bio-signature and the biological entity fails to interact with the interaction component.

17. The implant according to claim 16, further comprising:
a biocompatible material that seamlessly encapsulates and seals the platform and the at least one sensor.

18. The implant according to claim 17, wherein the biocompatible material includes a conductive portion arranged over the at least one sensor such that the at least one sensor is configured to sense the biological environment through the conductive portion of the biocompatible material.

19. The implant according to claim 18, wherein the conductive portion of the biocompatible material comprises a silicone elastomer doped with biocompatible conductive particles.

20. An implant comprising:
a sensor configured to sense a biological environment surrounding the implant;
a memory including stored data;
a communication component configured to communicate with an external system across a network; and
a processor configured to:
generate a bio-signature corresponding to the biological environment based on an output produced by the sensor;
receive an access request that originated from the external system;
determine that the biological environment corresponding to the bio-signature cannot be sensed by the sensor; and
deny the external system access to the stored data.

21. The implant of claim 20, further comprising:
a biocompatible material that fully encapsulates the sensor, the memory, the communication component, and the processor,
wherein the biocompatible material includes a conductive portion that is arranged over the sensor such that the sensor senses the biological environment through the conductive portion.

22. The implant of claim 20, further comprising:
an interaction component with which a biological entity is able to interact while the implant is implanted in the biological entity,
wherein the interaction component enables the biological entity to communicate consent to allow the external system access to the stored data and allow cryptographic operations to continue.

23. The implant of claim 20, wherein the sensor is a light detection sensor configured to detect changes in diffusion, caused by changes in density of tissue surrounding the implant.

* * * * *